United States Patent [19]

Shiramizu et al.

[11] Patent Number: 4,563,569
[45] Date of Patent: Jan. 7, 1986

[54] GAS SHIELDED ARC WELDING TORCH WITH CONSUMABLE ELECTRODE WIRE

[75] Inventors: Kousuke Shiramizu, Toyota; Yoshirou Awano, Nagoya; Hiroji Okada, Takatsuki; Hiromu Yamagami, Osaka; Hiroshi Takai, Takatsuki, all of Japan

[73] Assignees: Osaka Transformer Co., Ltd.; Toyota Jidosha Kabushiki Kaisha, both of Japan

[21] Appl. No.: 498,853

[22] Filed: May 27, 1983

[30] Foreign Application Priority Data

Nov. 17, 1982 [JP] Japan .................. 57-174686[U]

[51] Int. Cl.[4] .............................................. B23K 9/16
[52] U.S. Cl. .................. 219/137.43; 219/74; 219/137.44; 219/137.61
[58] Field of Search ............... 219/74, 137.43, 137.44, 219/137.61

[56] References Cited

U.S. PATENT DOCUMENTS 4,482,797 11/1984 Shiramizu et al. ............ 219/137.61

Primary Examiner—C. L. Albritton
Assistant Examiner—Alfred S. Keve
Attorney, Agent, or Firm—Jackson & Jones

[57] ABSTRACT

A gas shielded arc welding torch is described which uses a consumable electrode wire. A cylindrical support member carries a guide tube for guiding the electrode wire through the torch. An electrical contact member is pivotably mounted at the end of the torch and includes a bore through which the wire passes. A spring biases the contact member into constant engagement with the electrode wire. A gas nozzle is mounted on the cylindrical support member and is movable with the contact member to provide a uniform, constant-dimensioned shielding gas passage around the contact member regardless of the movement thereof.

15 Claims, 11 Drawing Figures

GAS SHIELDED ARC WELDING TORCH WITH CONSUMABLE ELECTRODE WIRE

BACKGROUND OF THE INVENTION

The present invention generally relates to welding and more particularly, to a welding torch employing a welding wire as a consumable electrode.

Commonly, when a consumable electrode is employed for a welding torch, electric current is fed to the electrode through a contact member held in contact with said electrode. In that case, a large amount of servicing of the welding torch has been required owing to the resultant severe abrasion or wear of the contact member. In order to cope with the problem as described above, there has conventionally been proposed an arrangement as shown, for example, in FIGS. 1 through 3.

More specifically, in the known welding torch in FIGS. 1 through 3, first and second abrasion-resistant guide members 3a and 3b are provided along an electrode passage in a torch body 1' so as to be spaced apart from each other. An abrasion resistant guide block 3c having a thickness smaller than the width of the electrode is provided at one side of the electrode passage between the guide members 3a and 3b. An electrode 25 is held between the guide block 3c and a contact member 7' having a thickness exceeding the width of the electrode. Electrode 25 is delivered while being fed with the electric current through the contact member 7', in order to perform the welding operation. Accordingly, the contact member 7' is merely formed with a deep groove as shown in FIG. 2 even if it is worn out. Thus welding operations may be performed without hindrance.

Incidentally, in an arc welding, the so-called stick phenomenon often takes place wherein the electrode tip adheres to an item to be welded (not shown) during arc starting or during welding. In this case, resistance heating represented by $I^2R$ is produced in the electrode between the contact member 7' and the top of the electrode 25, i.e., between the current feeding position and welding position at the electrode tip. Thus, the electrode is extremely softened and therefore weak. In connection with the above, although the delivery of the electrode is arranged to be properly interrupted through detection, for example, of short-circuit current, the delivery of the electrode is seldom suspended immediately when the electrode tip has been fused onto the item to be welded. Namely, even after the electrode tip has been fused onto the item to be welded, the electrode in its extremely softened state is still delivered, to a certain extent, onto the items to be welded. In the above case, since the second abrasion-resistant guide member 3b is disposed adjacent electrode 25 between the end of the electrode 25 and the contact position between the contact member 7' and the end of electrode 25 as shown in FIG. 1, the extremely softened electrode section delivered towards guide member 3b is deformed by the member so as to create an enlarged section which resists further movement through the second abrasion resistant guide member. This so-called stick phenomenon, as shown in two-dotted chain lines in FIG. 3, prevents further feeding of the electrode in many cases. In such a case, it is a general practice to start the torch again after cutting off the electrode tip automatically or manually upon formation of the stick phenomenon. However, the electrode cannot be fed towards the item to be welded due to presence of the enlarged electrode section adjacent the entrance of the second abrasion-resistant guide member 3b as described above. Accordingly, it has been necessary for the operator to grasp the electrode tip with cutting pliers or the like and pull the electrode in the direction of X1 thereby drawing the enlarged electrode section through member 3b. However, since the space between the end of the welding torch and the item being welded is normally selected to be approximately 10 through 30 mm, the torch must be moved away from the item in the direction of X'2 a sufficient distance to allow removal of the seized electrode portion, thus resulting in inferior operability. Although sintered porcelain, which is superior in abrasion resistance and heat resistance, is normally used as the guide members, the mechanical strength of such sintered porcelain is not so high. Thus, there are cases where the guide members are damaged during forced removal of the seized electrode portion as described above, thus resulting not only in economic disadvantage, but the necessity of replacement of the guide member. Furthermore, in the arc welding operation using a consumable electrode, molten metal particles at high temperatures, i.e. the so-called sputter, are generally scattered. In a welding torch having such a construction as shown in FIG. 1 through FIG. 3, the sputter tends to enter through an opening or the like into the passage of the electrode wire or sliding groove portion of the contact member, so that delivery of the electrode wire or movement of the contact member may be interfered with. In the conventional welding torch as described above, a cover member may be used to prevent the sputter from entering the passage of the electrode wire and sliding groove portion of the contact member. However, in this case, it is difficult to manufacture a cover member to be applied to a narrow portion, thus requiring high manufacturing cost. In addition, even when the cover member is provided, maintenance of the torch tip end portion cannot be effected sufficiently, thus resulting in poor operability. Meanwhile, in the case where the so-called gas shielded arc welding is effected with the use of the conventional welding torch as described above, it is impossible to carry out welding in small spaces due to the large size at the forward end of the welding torch, with a difficulty in forming a passage for the shielding gas towards the item to be welded.

SUMMARY OF THE INVENTION

Accordingly, an essential object of the present invention is to provide an improved welding torch compact in size and efficient in operation, which prevents interference of the feeding of the electrode wire by sputter which has a passage for maintaining a stable shielding gas flow, and which is capable of resuming welding by cutting off an end portion of the electrode wire even when such end portion is fused onto an item to be welded.

Another important object of the present invention is to provide a welding torch of the above described type which is simple in construction, and can be readily manufactured on a large scale at low cost.

In accomplishing these and other objects, according to one preferred embodiment of the present invention, there is provided a welding torch which includes a contact member constituted by a power feeding member formed therein with a through-opening for passing a consumable electrode wire therethrough and a cylindrical support member for supporting the power feeding member, and a fixed guide member for guiding the electrode wire. The guide member is inserted, at its free end portion, into the contact member, and a power feeding connecting member is provided at a base portion of a torch body for the welding torch which is connected to the support member of said contact member through a flexible connecting member. A cylindrical member is provided which covers a portion from the base portion extending of the torch body to the flexible connecting member and a base portion of said contact member. Support pins are provided on the cylindrical member to confront each other for supporting said contact member so as to be tiltable in a plane including an axis of the electrode wire and also, to be restricted in a direction generally intersecting at right angles with said plane. A gas nozzle is detachably mounted on a free end portion of the support member of said contact member, and a shielding gas passage is formed to extend from the base portion of the torch body to the inner portion of the gas nozzle. A pressure means is provided for urging the contact member and the gas nozzle towards the electrode wire as one unit.

By the arrangement according to the present invention as described above, an improved welding torch highly efficient in operation has been advantageously presented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
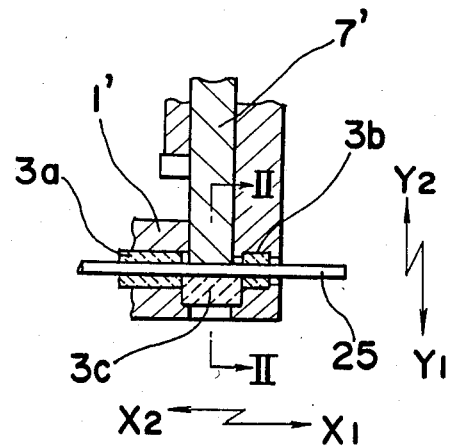
FIG. 1 is a fragmentary side sectional view of a main portion of a conventional welding torch (already referred to)
Figure 2:
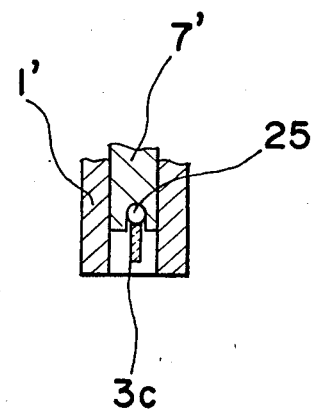
FIG. 2 is a fragmentary cross sectional view taken along the line II—II of FIG. 1 (already referred to)
Figure 3:
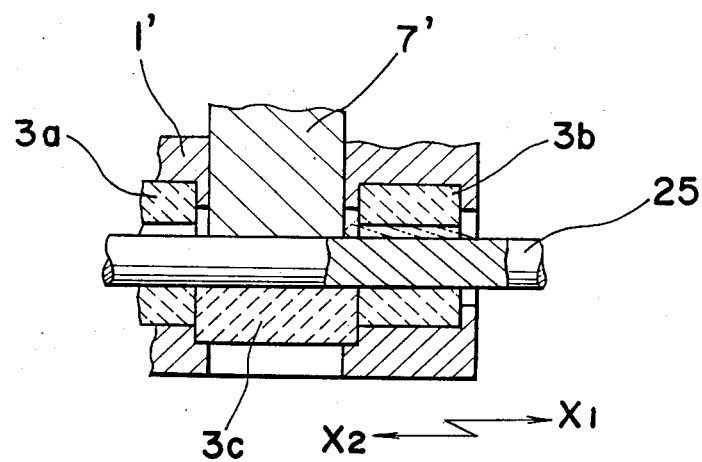
FIG. 3 is a fragmentary side sectional view showing on an enlarged scale, a lower portion of the welding torch of FIG. 1 (already referred to)

Before the description of the present invention proceeds, it is to be noted that like parts are designated by like reference numerals throughout the accompanying drawings.

Referring now to the drawings, there is shown in FIGS. 4 through 7, a welding torch WA according to one preferred embodiment of the present invention.

In FIGS. 4 through 7, the welding torch WA generally includes a torch body 1 coaxially formed with a central bore or through-opening 101 along its axis. An abrasion-resistant guide tube 2 is provided which is detachably accommodated in said through-opening 101 and formed with a bore 2a, for example, of a circular cross section. Another abrasion-resistant guide block 3 coaxially formed with a through-opening 301 generally along the axis thereof is provided, said guide block 3 being, for example, detachably mounted at the forward end portion of the torch body 1 in a direction of X1.

The torch body 1, guide tube 2 and guide block 3 constitute a fixed guide member 4 for guiding an electrode wire 25.

The welding torch WA further includes a support member 5 in a cylindrical configuration and a power feeding member 6 of an electrically conductive material, having a through-bore 601 coaxially formed generally along its axis and also a hole 602 with a bottom, which opens in the direction of X2. The above power feeding member 6 is, for example, threaded onto the end portion of the support member 5 in the direction of X1. The support member 5 and the power feeding member 6 constitute a contact member 7 composed of an electrically conductive material, for example, an alloy of copper or copper group, and in the interior of said contact member 7, the free end of the fixed guide member 4 is inserted.

At the base portion of the torch body 1, there is provided a flange portion 102, which is held between a power feeding connecting member 11 and an intermediate member 12 through insulating members 8 and 9 of suitable shapes. The support member 5 for supporting the power feeding member 6 and the intermediate member 12 are connected to each other by a flexible connecting member 13, for example, by a strand wire made of copper or copper group alloy and formed into a cylindrical configuration. Meanwhile, a cylindrical member 14 including members 141 and 142 is supported at the base portion side of the torch body 1 so as to cover flexible connecting member 13 and the base portion of the contact member 7. Moreover, the support member 5 is pivotally supported with respect to the cylindrical member 14. For example, as shown in FIG. 5, the second cylindrical member 142 formed by an electrically insulating material supports the support member 5 through confronting support pins 15, while said support member 5 is in contact with the opposed faces 151 of the support pins 15 so as to be positioned in directions of Z, with a resilient air-tight member 16, for example, an "O" ring being provided between the cylindrical member 142 and the support member 5. The torch body 1 is suitably supported by a mounting member 18 (FIG. 4) through an electrically insulating member 17 disposed in the X2 direction side.

The welding torch WA of FIGS. 4 to 7 is further provided with a pressure means 19 constituted, for example, by a plate spring 191 supported, at its one end, on the torch body 1 by a support piece 192, with the other end of said plate spring 191 contacting an electrically insulating member 193 provided on the support member 5. On the free end of the support member 5, there is detachably mounted a gas nozzle 21 which is constituted, for example, by a nozzle 211 of an electrically insulative material and another nozzle 212 made of a metallic material. The gas nozzle 21 and the contact member 7 are normally urged counterclockwise about the support pins in FIG. 4 as one unit, by the pressure means 19. The guide member 4 is formed with one or more bores 22, while the support member 5 is also provided with two or more bores, for example, four bores 23 radially formed at approximately equal intervals in a circumferential portion of the support member 5. Through said bores 22 and 23 and a cylindrical space 24, the passage of the electrode wire 25 is communicated with the inner space of the gas nozzle 21. The power feeding connecting member 11 is further formed with a bore 110, through which said power feeding connecting member 11 is connected to a power feeding device (not particularly shown).

In the above arrangement, the electrode wire 25 is fed in the direction of X1 by a feeding apparatus (not shown) while suitable electric power for welding is fed to the contact member 7 through the power feeding device (not shown) after said electrode wire 25 has reached the through-bore 601 of the power feeding member 6, and thus, welding is carried out by feeding the electrode wire 25, with the shielding gas being caused to flow out through the gas nozzle 21. In the embodiment as shown in FIG. 4, the shielding gas is fed by utilizing the passage for the electrode wire 25, and flows into the interior of the gas nozzle 21 through the bore 22, cylindrical space 24 and bores 23.

Figure 4:
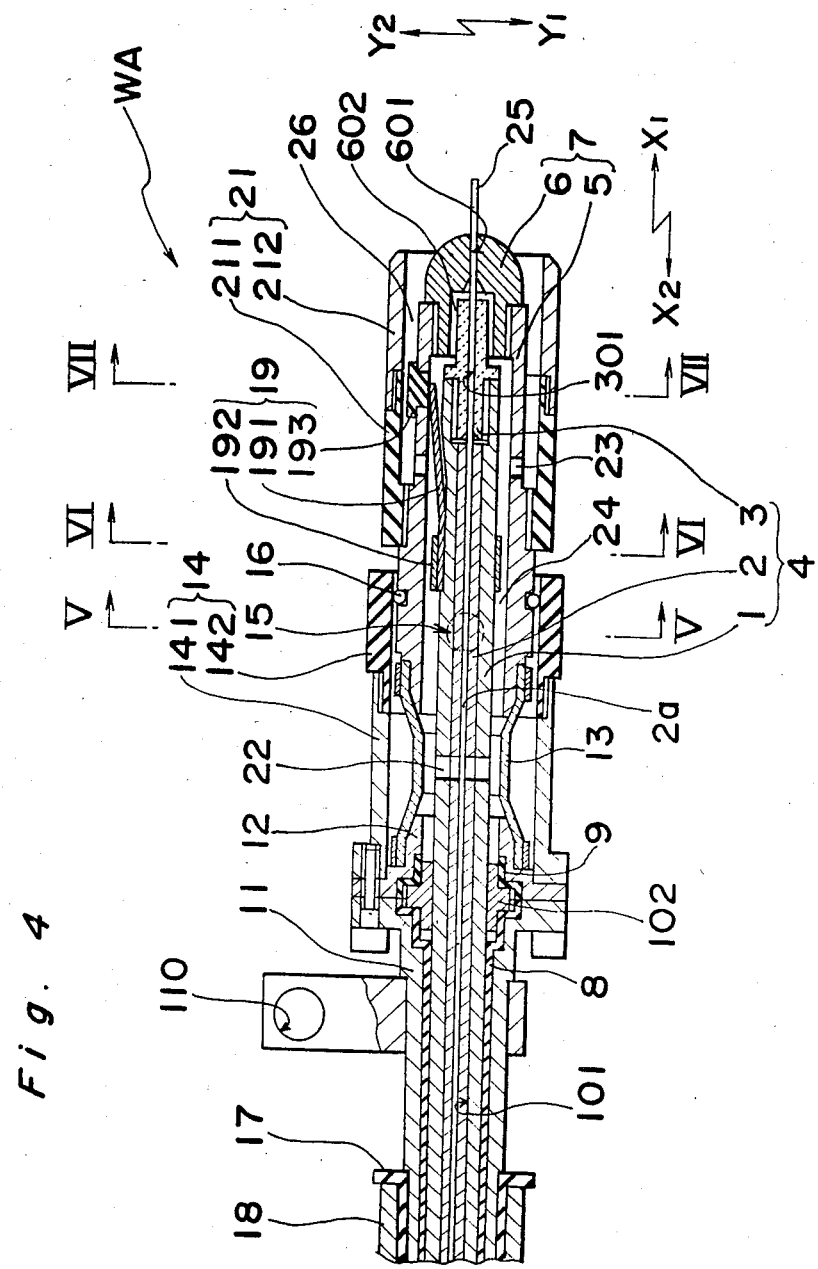
FIG. 4 is a side sectional view of an improved welding torch according to one preferred embodiment of the present invention.
Figure 5:
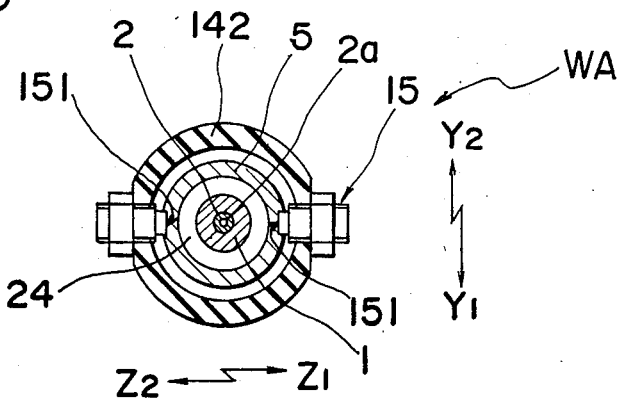
FIGS. 5 to 7 are fragmentary cross sections respectively taken along lines V—V, VI—VI, and VII—VII in FIG. 4.
Figure 6:
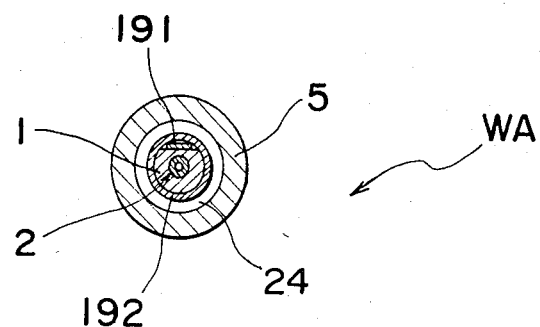
Figure 7:
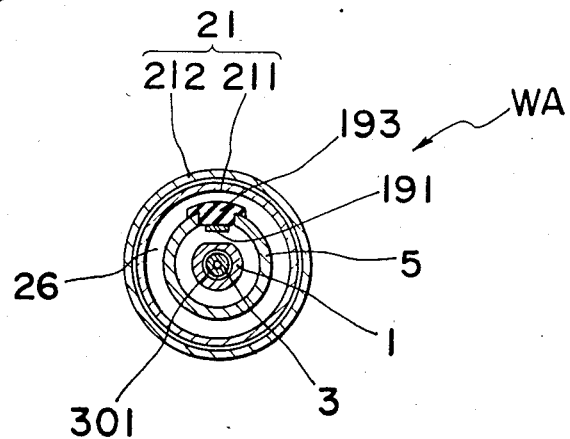
Figure 8:
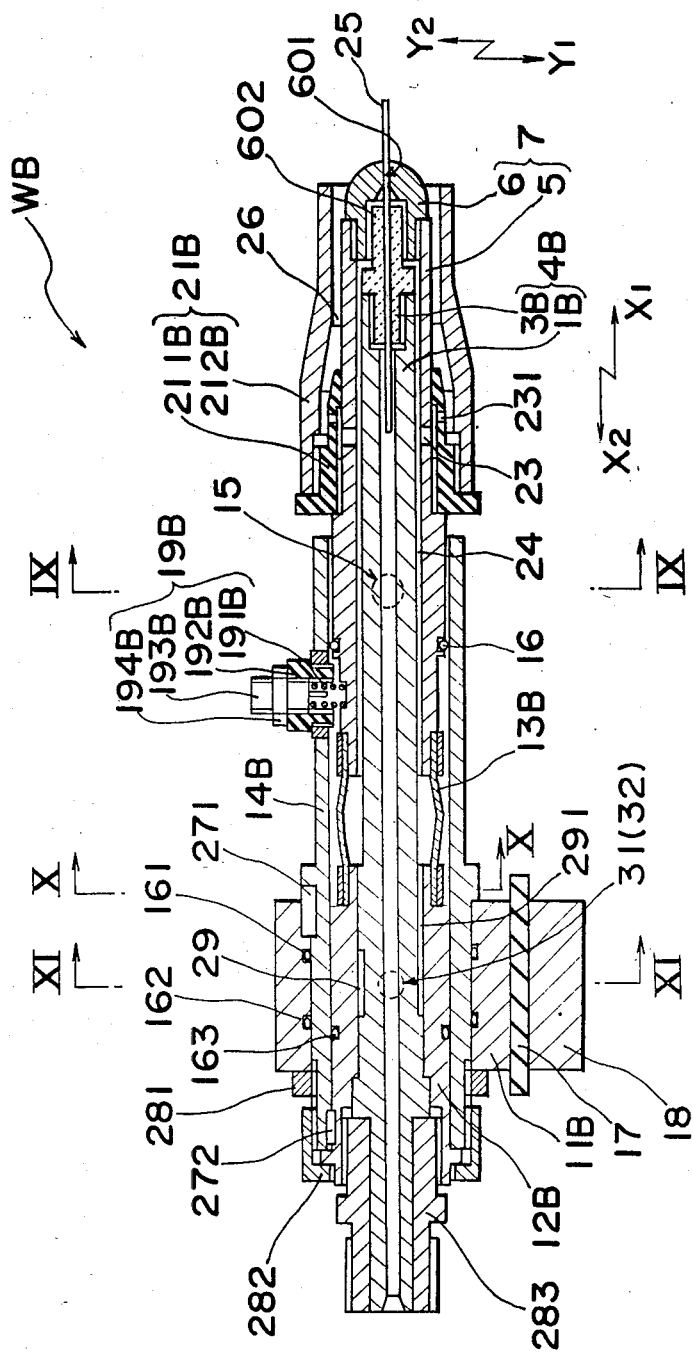
FIG. 8 is a side elevational view showing a welding torch according to another embodiment of the present invention.
Figure 9:
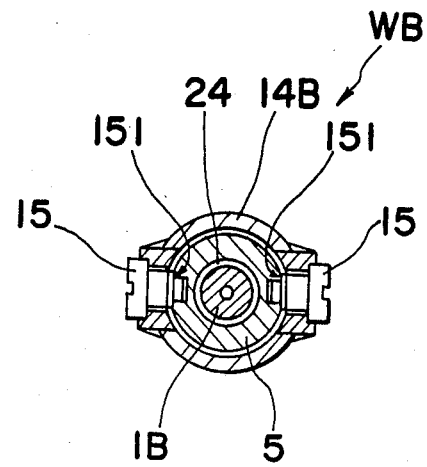
FIGS. 9 to 11 are fragmentary cross sections respectively taken along lines IX—IX, X—X, and XI—XI in FIG. 8.
Figure 10:
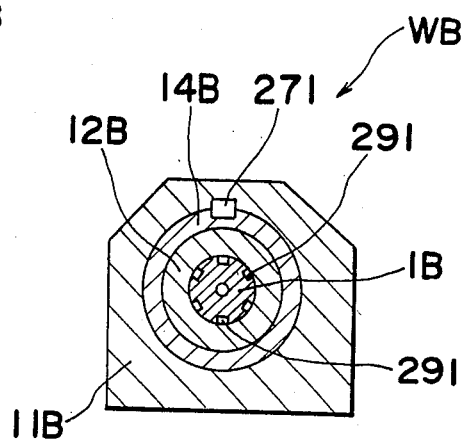
Figure 11:
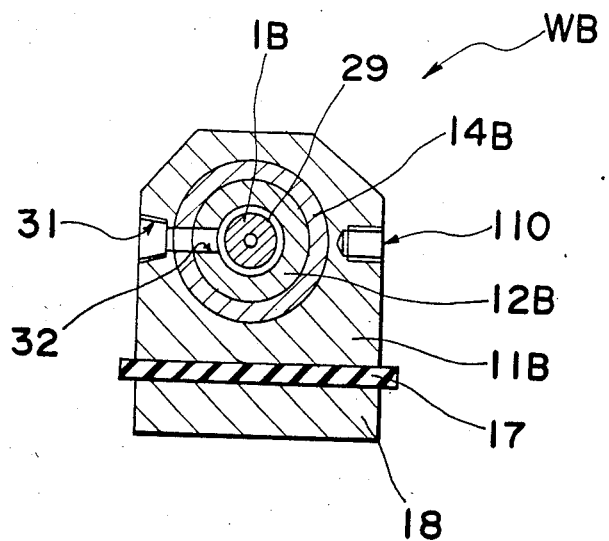

In the above case, the contact member 7 is urged in the direction of Y2 by the pressure means 19 and thus, the end portion of the contact member 7 is pivoted counterclockwise in FIG. 4 about the support pins 15 to come into contact with the electrode wire 25. Namely, the electrode wire 25 to be fed in the direction of X1 by a feeding apparatus (not shown) is restricted by the guide block 3, and is fed to a welding position through sliding contact with the tip end member of the contact member 7, i.e., the power feeding member 6. Incidentally, the portion of the power feeding member 6 equivalent to the power feeding position thereof is gradually worn off as the welding operation proceeds, but since the member 6 supported by the support member 5 is urged in the direction of Y2 by the pressure means 19, said member 6 is always held in contact with the electrode wire 25, irrespective of abrasion of the member 6 so as to feed the electric power for welding positively in a steady state.

Furthermore, owing to the arrangement that the gas nozzle 21 is supported at the free end of the contact member 7, with said gas nozzle 21 and contact member 7 being arranged to rotate in one unit about the support pins 15, a cylindrical space 26 defined by the gas nozzle 21 and the contact member 7 may be maintained in a predetermined configuration at all times, regardless of abrasion of the power feeding member 6. When said cylindrical space 26 within the gas nozzle 21 is maintained under the constant state as described above, the stream of the shielding gas is naturally held at a constant state for making it possible to effect a uniform welding.

It is to be noted here that, the electrode wire 25 restricted by the fixed guide member, particularly by the guide block 3 is fed to a predetermined position in the direction of Y, irrespective of wearing of the power feeding member 6, but on the contrary, the gas nozzle 21 and the contact member 7 are pivoted as one unit in the direction of Y2 about the support pins 15 as the power feeding member 6 is gradually abraded, and there is a possibility that the axis of the electrode wire 25 goes out of alignment with respect to the axis of the stream of the shielding gas discharged from the gas nozzle 21. However, since the distance between the power feeding member 6 and the item to be welded (not shown) are generally set in the range of approximately 10 to 30 mm, while the shielding gas discharged from the gas nozzle 21 is of a laminar flow in an annular shape which may be directed to a comparatively large area including the welding point, there is no tendency that the gas shielding effect is substantially altered, even if the axis of the stream of the shielding gas is not in alignment with the axis of the electrode wire.

Moreover, since the through-bore 601 of the power feeding member 6 is gradually abraded in the direction of Y1 as the welding proceeds, a space tends to be formed at the upper portion of the through-bore 601, i.e. in the direction of Y2, in correspondence to the amount of the above abrasion. It is possible that, as the space becomes larger, sputter caused during the arc welding scatters in the direction of X2, but, owing to the fact that the electrode wire 25 is fed in the direction of X1 at all times during the welding operation, such sputter as described above is carried outwardly through the space at the upper portion of the through-bore 601 as the electrode wire 25 is delivered. Meanwhile, since the power is fed, with the approximate semi-circular portion in the direction of Y1 of the through-bore 601 being normally held in sliding contact with the electrode wire 25, the sputter cannot enter the feed portion. It is to be noted that, although it is advantageous to form at least the end portion of the power feeding member 6 into a spherical convex shape since the sputter is hard to adhere onto such spherical convex portion and may be readily removed even upon adhesion thereonto, the shape of said end portion may be altered to other configurations, for example, to a truncated cone shape.

Thus, power feeding is not affected by sputter at all, with the guide member 4 being advantageously covered by the contact member 6 and cylindrical member 14, etc., and therefore, there is no possibility that sputter enters the feeding passage of the electrode wire 25.

As described above, since the sputter does not interfere with the feeding of the electrode wire or does not hinder the power feeding, while the welding operation similar to that under the early stage may be performed, even if the contact member is worn out to a certain extent, uniform welding may be effected for a long period of time, which feature is particularly effective for automatic welding equipment. Incidentally, when the tip end of the electrode wire has fused onto the welding item during arc start or during welding, the electrode wire is fed, to some extent, to the side of the welding item as described earlier. In this case, in the torch according to the present invention, no inconvenience is caused, because the contact member 6 may be properly pivoted about the pins 15 for displacement. Moreover, since the abrasion-resisting guide member like the conventional one is not disposed on the side of the welding item beyond the power feeding position, the undesirable seizing of molten electrode, as in a conventional torch, does not take place. Accordingly, even when the electrode wire has been fused onto the welding item being welded, the welding operation may be immediately restarted by simply cutting the tip of the electrode wire.

Additionally, since the support member 5 is arranged to contact the opposed faces 151 of the support pins 15 so as to be positioned with respect to the direction of Z, power may be fed under a steady state, in cooperation with the provision of the guide block 3.

Reference is made to FIG. 8 through FIG. 11 showing a welding torch WB according to another embodiment of the present invention, in which like parts in FIGS. 4 through 7 are designated by like reference numerals for brevity of description. In this embodiment, the guide tube 2 described as employed in the arrangement of FIGS. 4 to 7 is omitted, and the power feeding connecting member 11B and the cylindrical member 14B are positioned to each other by a positioning member 271, for example, a key member in the rotating direction, and supported as one unit by a clamping member 281, for example, by a nut. Meanwhile, the intermediate member 12B and the cylindrical member 14B are mutually positioned by a positioning member 272, for example, a key member in the rotating direction, and supported as one unit by a clamping member 282, for example, a cap nut. The torch body 1B extends generally axially through the intermediate member 12B and is supported to be integral with said intermediate member 12B by a clamping member 283, for example, an adapter threaded into the end portion of the intermediate member 12B in the direction of X2.

Around the outer periphery at the base portion of the torch body 1B, there is provided a groove 29, which is coupled with grooves 291 (FIG. 10) axially extending at the peripheral portion of the torch body 1B so as to be in communication with the cylindrical space 24 defined by the torch body 1B and the support member 5. The power feeding connecting member 11B is formed, for example, with a connecting port 31 for the shielding gas (FIG. 11), and this connecting port 31 is in communication with the groove 29 provided at the outer periphery of the torch body 1B by a through-bore 32 extending through a suitable member. Meanwhile, the support member 5 is pivotally supported by the support pins 15 at the free end, i.e. the end portion in the direction of X1 of the cylindrical member 14. In the embodiment as shown, the support pins 15 should preferably be made of an electrically insulative material. Onto the cylindrical member 14B, there is threaded a bush 192B of an electrically insulative material, while an adjusting screw 193B is threaded onto said bush 192B, with a compression spring 191B being disposed between said adjusting screw 193B and the support member 5. In the above structure for the pressure means 19B, the adjusting screw 193B is locked by a nut 194B, after properly adjusting the rotating force of the contact member 7 with respect to the support pins 15 through rotation of the adjusting screw 193B. In the above arrangement, since air-tight members 161, 162 and 163 are properly provided between the power feeding connecting member 11B and the cylindrical member 14B, and also between said cylindrical member 14B and the intermediate member 12B as shown, the shielding gas supplied from the connecting port 31 is caused to flow into the welding position through the through-bore 32, grooves 29 and 291, cylindrical space 24, through-bores 23 and 231 and the annular space 26 of the gas nozzle 21B. It is needless to say that the above arrangement may further be so modified that the groove 29 is provided in the inner periphery of the intermediate member 12B.

By the arrangement of FIGS. 8 through 11, it is possible to effect fine adjustments of the state of contact between the electrode wire 25 and the contact member 7, even during welding operation.

In the embodiment as described earlier with respect to FIGS. 4 to 7, the guide tube 2 employed therein may be made of a wire material having a suitable cross section such as circular or rectangular shape and formed into a generally cylindrical configuration, while the cross section of the electrode wire may also be formed into a non-circular shape, for example, a rectangular configuration.

Meanwhile, it is preferable to electrically insulate the consumable electrode wire 25 from the torch body 1, for example, by coating an electrically insulating material onto the outer periphery of the guide tube 2. When the guide tube 2 is provided as described above, the electrode wire 25 may be smoothly guided by replacing the guide tube with a new one according to the abrasion of such guide tube, and if the guide tube, guide member and power feeding member are respectively arranged to be detachable, it becomes possible to embody welding torches suitable for electrode wires in various configurations, by replacing the above members with those having through-bores corresponding to required electrode wires.

Nevertheless, the guide tube 2 may be omitted depending on necessity as in the embodiment of FIGS. 8 to 11.

Moreover, in the foregoing embodiments, since the fixed guide member 4, contact member 7 and gas nozzle 21 are supported generally coaxially, the forward end portion of the welding torch may be made compact for application thereof even to welding portions in narrow and small spaces.

Furthermore, if the torch body, support member, contact member, and cylindrical member, etc. are arranged to be forcibly cooled by suitable means, various parts of the welding torch are not subjected to high temperatures for facilitation in handling and longer servicing life of the welding torch.

As is clear from the foregoing description, according to the present invention, it is so arranged that the contact member and the gas nozzle are supported as one unit for pivotal movement about the support pins with respect to the fixed guide member. Thus, the stream of shielding gas directed to the welding spot has a gas shielding effect equal to that at the initial state even when the power feeding member is abraded during welding operation, and thus, uniform welding may be effected. Meanwhile, owing to the arrangement that the fixed guide member, the contact member and the gas nozzle are disposed generally coaxially, the welding torch, particularly the forward end portion thereof, is made compact in size for efficient application to welding portions in small spaces. Moreover, since the arrangement is free from entry of sputter during feeding of the electrode wire, there is no possibility that the smooth delivery of the electrode is hindered. Since the contact member is positioned in the direction of Z by the support pins in cooperation with the arrangement that the power is fed, with the electrode wire and the contact member being held in sliding contact by the pressure means at all times, not only the power feeding is effected under a steady state, but also the alignment of the electrode wire is generally constant for positive welding. Furthermore, since the contact member may be properly displaced pivotally, while said contact member formed with the through-hole 601 is made of an electrically conductive material, there is no possibility that the undesirable seizing of the molten electrode takes place as in the conventional arrangements, even when the tip of the electrode has fused onto the item being welded. Accordingly, during the adhesion, the welding may be restarted simply by cutting the electrode tip portion while the electrode is being fed, with a consequential favorable operability.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A welding torch which comprises a contact member which includes a power feeding member formed therein with a through-opening for passing a consumable electrode wire therethrough and a cylindrical support member for supporting said power feeding member; a fixed guide member for guiding the electrode wire, said guide member being inserted, at its free end portion, into said contact member; a power feeding connecting member provided at a base portion of a torch body for the welding torch, and connected to the support member of said contact member through a flexible connecting member; a cylindrical member which covers a portion from the base portion of said torch body to said flexible connecting member and a base portion of said contact member, a resilient sealing member positioned between the cylindrical member and the cylindrical support member; support pins provided on said cylindrical member to confront each other for supporting said contact member so as to be tiltable in a plane including an axis of the electrode wire against the resilient sealing member and also, to be restricted in a direction generally intersecting at right angles with said plane; a gas nozzle detachably mounted on a free end portion of the support member of said contact member; a shielding gas passage formed to extend from the base portion of said torch body to the inner portion of said gas nozzle; and a pressure means for urging said contact member and said gas nozzle towards the electrode wire as one unit.

2. A welding torch as claimed in claim 1, wherein said contact member is supported through contact thereof with confronting faces of said support pins.

3. A welding torch as claimed in claim 1 or 2, wherein said power feeding member of said contact member has at least its forward end portion, formed into a spherical convex shape.

4. A welding torch as claimed in claim 1, wherein said fixed guide member comprises the torch body coaxially formed with a through-opening along its axis, an abrasion-resisting guide tube detachably accommodated in said through-opening and formed with a bore, and an abrasion-resistant guide block coaxially formed with a through-opening generally along the axis thereof and detachably mounted at one end portion of the torch body.

5. A welding torch as claimed in claim 1, wherein said fixed guide member comprises the torch body coaxially formed with a through-opening along its axis, and an abrasion-resistant guide block coaxially formed with a through-opening generally along the axis thereof and detachably mounted at one end of the torch body.

6. A welding torch as claimed in claim 1, wherein said pressure means includes a plate spring supported, at its one end, on the torch body by a support piece, with the other end of said plate spring contacting an electrically insulating member provided on said support member.

7. A welding torch as claimed in claim 1, wherein said pressure means includes an electrically insulating bush member threaded onto the cylindrical member, an adjusting screw threaded onto said bush member, a compressing spring disposed between said adjusting screw and said support member, and a nut arranged to lock said adjusting screw after adjustment of rotating force of said contact member with respect to said support pins through rotation of said adjusting screw.

8. The invention of claim 1 wherein the shielding gas passage extends for a portion of its length whithin the contact member.

9. In an arc welding torch comprising a torch body through which a consumable electrode wire is generally axially extended, a guide member provided at a forward end portion of said torch body for guiding the electrode wire through a through-hole generally axially formed therein, a contact member formed with a cylindrical forward portion constituted by a power feeding member having a through-bore for passing the electrode therethrough and a cylindrical support member detachably supporting said power feeding member, said guide member being covered by said cylindrical forward portion of said contact member, said support member being pivotally supported so that it can move in a direction generally intersecting at right angles with the axis of the electrode wire with respect to said torch body, and a pressure means for relatively urging said support member toward the side of the electrode wire, the improvement thereof further comprising a gas nozzle detachably mounted on said support member through an electrically insulative material, the gas nozzle and the contact member being normally adapted to move as one unit by urging of the pressure means while providing a shielding gas passage between the gas nozzle and the contact member in uniform, constant dimensions regardless of the movement thereof, and side shielding gas feeding means for feeding shielding gas toward the shielding gas passage.

10. The invention of claim 9 including a cylindrical member and wherein said support member is pivotally supported by a pair of support pins provided on said cylindrical member to confront each other.

11. The invention of claim 10 wherein said contact member is supported through contact thereof with confronting faces of said support pins.

12. The invention of claim 10 wherein said guide member is in contact with the shielding gas feeding means for substantially its entire length.

13. The invention of claim 10 including a resilient sealing member positioned between the cylindrical member and the cylindrical support member.

14. The invention of claim 9 wherein said power feeding member is formed at the end portion into a spherical convex shape.

15. The invention of claim 9 wherein said pressure means includes a plate spring supported, at its one end, on the torch body, with the other end of said plate spring contacting an electrically insulating member provided on said support member.

* * * * *

UNITED STATES PATENT AND TRADEMARK OFFICE
CERTIFICATE OF CORRECTION

PATENT NO. : 4,563,569
DATED : January 7, 1986
INVENTOR(S) : KOUSUKE SHIRAMIZU; YOSHIROU AWANO; HIROJI OKADA; HIROMU YAMAGAMI; HIROSHI TAKAI.

It is certified that error appears in the above—identified patent and that said Letters Patent is hereby corrected as shown below:

In Col. 1, line 60, between "abrasion" and "resistant" should be --- - ---.

In Col. 2, line 45, after "torch," delete --- with a difficulty in forming a passage for --- and insert --- which conducts ---.

Signed and Sealed this

Twelfth Day of August 1986

[SEAL]

Attest:

DONALD J. QUIGG

Attesting Officer

Commissioner of Patents and Trademarks